Patented Aug. 23, 1949

2,479,692

UNITED STATES PATENT OFFICE 2,479,692

PRODUCTION OF POTASSIUM HYDROXIDE COMPOSITION

Glen H. Morey and Everet F. Smith, Terre Haute, Ind., assignors to Commercial Solvents Corporation, Terre Haute, Ind., a corporation of Maryland No Drawing. Application June 11, 1945,
Serial No. 598,918

6 Claims. (Cl. 252—192)

Our invention relates to a novel process for obtaining potassium hydroxide in a finely-divided and highly-active state. More particularly, it relates to such finely-divided and highly-active potassium hydroxide in the form of a suspension in a diether, and to a method for preparing such suspensions by heating solid potassium hydroxide or aqueous solutions thereof with a diether in the presence or absence of a small proportion of a primary monohydric aliphatic alcohol containing from four to eight carbons atoms, as described hereinafter.

For carrying out various chemical processes, it is often desirable to utilize potassium hydroxide in a finely-divided state, suspended in a carrying medium. This is particularly true, for example, in the reactions involving the absorption of 1-alkynes such as acetylene, in which a very large surface area of the potassium hydroxide must be present to absorb the acetylene and to convert it into a form suitable for subsequent reaction with carbonyl compounds to form acetylenic alcohols.

Ordinary mechanical methods for obtaining the potassium hydroxide in the finely-divided and highly-active state necessary for this and other purposes have presented many difficulties. Mechanical grinding of the solid potassium hydroxide has been difficult and not as effective as desired because the solid potassium hydroxide presents a waxy effect to the grinder and resists comminution. This results in a product that is too coarse for easy suspension in the carrying liquid, and too coarse for most effective use in the processes referred to.

We have now found that solid potassium hydroxide can be heated to its fusion temperature with a liquid of the type hereinafter described and subsequently cooled with agitation below its melting point to form a slurry of finely-divided solid particles of highly reactive potassium hydroxide in the liquid. Commercial potassium hydroxide U. S. P. pellets containing 10–13% water may be thus fused at a temperature around 100° C., and hence, a relatively low boiling diether can be used. With other grades containing lower percentages of water, it is necessary to use higher boiling diethers or to operate the reactor under pressure, in order to effect fusion.

We have also found that when a liquid of the type hereinafter described is added to an aqueous solution of potassium hydroxide and the mixture distilled with accompanying vigorous agitation, the water is removed in the form of a constant-boiling mixture with the dehydrating liquid. If desired, this azeotropic mixture may be dehydrated and the organic liquid returned to the potassium hydroxide-containing mixture undergoing distillation. In this manner, the "free" water, as hereinafter defined, can be substantially completely separated from the mixture, leaving a two-phase liquid residue which, when agitated and cooled, is converted into a suspension of finely-divided, solid particles of highly reactive potassium hydroxide in the liquid used for the dehydration.

The removal of all of the distillable water, as mentioned above, does not leave the still residue completely anhydrous. On the contrary, it may contain up to slightly below one mole of water per mole of potassium hydroxide, depending on the boiling point and relative concentration of the diether used for carrying out the dehydration. The water, however, does not behave like "free" water; it is apparently combined with the potassium hydroxide, and does not interfere with the activity of the residual anhydrous potassium hydroxide. In this connection, the expression "free" water herein referred to, is to be construed as meaning only that water which may be removed from the above-mentioned mixtures by distillation with diethers at liquid temperatures within the range of about 100° C. to about 300° C.

The complete separation of water from the potassium hydroxide solution is not essential for the preparation of a solid, finely-divided, active product utilizable for the processes described. In fact, the preparation of a strictly anhydrous potassium hydroxide would not be practical, since it has a melting point of about 360° C., and would be difficult or impossible to maintain in fluid condition at the boiling temperatures of many of the liquids of our invention. The product as it commonly appears in the so-called "dry" solid state as a commercial material is sufficiently dehydrated for our purposes. This form of potassium hydroxide fortunately can be maintained in a liquid condition at temperatures considerably below the melting point of anhydrous potassium hydroxide, so that it remains in fluid form at the boiling temperatures of the various liquids of our invention, some of which boil as low as about 100° C. to 110° C. at atmospheric pressure; and in such fluid condition the potassium hydroxide may readily be comminuted by the vigorous agitation and cooling employed in our process, and thereby finely dispersed in the carrying liquids described. Other liquids which we may use have somewhat higher boiling temperatures, but as a matter of convenience the majority of the liquids most adaptable to our processes will have boiling points below around 250° or 300° C., considerably below the melting point of the anhydrous potassium hydroxide.

The particular advantages of the potassium hydroxide composition of the present invention will be recognized when it is recalled that with prior existing methods involving the utilization of anhydrous potassium hydroxide, workers were confronted with the problem of recovering large quantities of that material from aqueous mixtures, dehydrating the potassium hydroxide, and then pulverizing it for re-use in the succeeding batch. It will be obvious that this requirement renders such practice substantially useless from an industrial point of view, since it is not economically feasible to recover large quantities of potassium hydroxide from aqueous mixtures thereof in an anhydrous condition and then to grind the materials to a finely-divided powder suitable for re-use.

In accordance with our invention, we utilize hydrous potassium hydroxide, either as the solid base, preferably the U. S. P. grade which contains approximately 12.5 per cent by weight of water, or aqueous potassium hydroxide of substantially any concentration, although of course, the more concentrated the solution, the more quickly will the water separation be effected.

The potassium hydroxide or solution thereof, as the case may be, is mixed with the appropriate diether and heated to fusion temperature or is subjected to distillation, in the case of aqueous solutions, in such a manner that the "free" water is removed as the azeotrope with the diether. The water may be removed from the azeotrope in known manner, and the diether continuously returned to the distillation vessel. Distillation is continued until no more water distills over. The still contents then exist in the form of two liquid phases, one phase comprising the diether, the other the fluid potassium hydroxide. After the distillation is complete, the contents of the distillation vessel are allowed to cool, usually down to room temperature to permit solidification of the potassium hydroxide, and during this cooling stage the vigorous agitation is continued. The agitation may be effected by any of the convenient known methods, but the turbulence should be of a magnitude sufficient to effect fine precipitation and thorough dispersion of the finely-divided particles. Potassium hydroxide, treated in this manner, presents a greater active surface than that produced by mechanical means, or by other processes using different types of dehydrating liquids; hence, a given weight of such potassium hydroxide will produce a greater weight of product in the reactions for which it is adapted.

We obtain our improved finely-divided and highly-active potassium hydroxide by the use of diethers which function to remove water from mixtures thereof with potassium hydroxide solutions, and which do not react irreversibly with the potassium hydroxide. Such diethers, it has been observed, have the property of activating potassium hydroxide for many reactions, the degree of activation being greatly enhanced by our processing technique. Diethers which are to be utilized under atmospheric pressure should preferably possess a boiling point of at least about 100° C. Lower-boiling diethers can be used, but require the application of super-atmospheric pressures in order to produce the desired liquid layer of potassium hydroxide. Specific examples of suitable diethers are 1-ethoxy-2-butoxyethane, 1,2 - dipropoxypropane, 2,3 - diethoxybutane, ethylene glycol diethyl ether, diethylene glycol diethyl ether, and 1,4-dioxane.

The finely-divided suspended particles of potassium hydroxide prepared by the use of diethers appear to differ decidedly both in size and physical structure from the particles of potassium hydroxide obtained by prior processes. They are, for example, somewhat more finely-divided than those formed in the hydrocarbons and of a fluffy or leafy character rather than of a sandy character such as is obtained in hydrocarbons alone. The physical characteristics of our potassium hydroxide particles produce a more enduring type of suspension; and when the particles do settle somewhat, they settle loosely without compacting, and can readily be resuspended with gentle stirring.

We have found that the reactivity of the finely-divided potassium hydroxide obtained by our process may be materially increased by incorporating with the diether used to remove the water from the potassium hydroxide a small proportion of a primary monohydric aliphatic alcohol containing from four to eight carbon atoms, such as for example, 1-butanol, methylallyl alcohol, 1-pentanol, isoamyl alcohol, and 1-octanol. The proportion of alcohol to diether may vary considerably. However, it has been our general observation that satisfactory results are consistently obtained when up to about 35 per cent of the alcohol, based on the total volume of the reaction menstruum, is utilized. When, for example, a mixture of a diether and an alcohol of the above type is used to prepare a finely-divided suspension of potassium hydroxide in accordance with our procedure, a grade of potassium hydroxide is obtained which when used in the condensation of suitable 1-alkynes with carbonyl compounds, ordinarily gives both a higher conversion to acetylenic alcohols and a higher output of acetylenic alcohols per unit volume of the reaction menstruum.

Although the potassium hydroxide mixtures of the present invention absorb 1-alkynes readily, substantially all of the latter are released if the solution is then heated, and the residue can again be used for further absorption. These potassium hydroxide mixtures will, therefore, be found useful for the removal of 1-alkynes of the above-mentioned class from various gas mixtures.

Our invention may be further illustrated by the examples which follow:

Example I

A mixture of 187 g. of potassium hydroxide U. S. P. pellets with 600 ml. of diethylene glycol diethyl ether was heated to reflux (liquid temperature, 185° C.), held 15 minutes, and cooled with agitation to form a slurry of finely-divided solid particles of potassium hydroxide in diethylene glycol diethyl ether.

Example II

A mixture of 187 g. of potassium hydroxide U. S. P. pellets, 558 ml. of diethylene glycol diethyl ether, and 42 ml. (approximately 7 per cent) butanol was heated to reflux (liquid temperature, 178° C.), held 15 minutes, and cooled with agitation to form a slurry of finely-divided solid particles of potassium hydroxide in a mixture of diethylene glycol diethyl ether and butanol.

Example III

A mixture of 187 g. of potassium hydroxide U. S. P. pellets with 600 ml. of ethylene glycol diethyl ether was heated to reflux (liquid temperature, 120° C.), held 15 minutes, and cooled with agitation to form a slurry of finely-divided solid particles of potassium hydroxide in ethylene glycol diethyl ether.

Example IV

A mixture of 187 g. of potassium hydroxide U. S. P. pellets with 202 ml. ethylene glycol diethyl ether, 356 ml. naphtha (125–150° C.), and 42 ml. butanol was heated to reflux (liquid temperature, 124°), held 15 minutes, and cooled with agitation to form a slurry of finely-divided solid particles of potassium hydroxide in a mixture of ethylene glycol diethyl ether, naphtha, and butanol.

Example V

Six hundred milliliters of diethylene glycol diethyl ether was added to 100 ml. of a 33 per cent aqueous solution of potassium hydroxide. The resulting mixture was heated to reflux temperature, and the "free" water removed therefrom in the form of an azeotropic mixture with the diethylene glycol diethyl ether, which after subsequent separation from the water in an auxiliary still, was returned to the still kettle. Throughout the heating period, and also while cooling, the mixture was stirred vigorously. The resulting composition consisted of a suspension of finely-divided solid potassium hydroxide in diethylene glycol diethyl ether.

Example VI

This experiment was carried out exactly as Example V with the exception that a mixture of 558 ml. of diethylene glycol diethyl ether and 42 ml. of butanol was employed as the dehydrating agent. The resulting composition consisted of a suspension of finely-divided solid potassium hydroxide in a mixture of diethylene glycol diethyl ether and butanol.

A surprising feature of our invention is the discovery that potassium hydroxide prepared in accordance with our invention using diethers is substantially more reactive than when prepared with other liquids such as, for example, hydrocarbons. This is illustrated by the data shown in the following table, taken from experiments in which potassium hydroxide slurries were first saturated with acetylene and subsequently reacted with acetone to form 2-methyl-3-butyne-2-ol. Column 1 represents six different samples of suspensions of potassium hydroxide prepared in exactly the same manner with different kinds of water-immiscible liquids.

"X–1" represents a suspension of potassium hydroxide prepared as described under Example I above.

"X–2" represents a similar suspension of potassium hydroxide prepared as described under Example II above.

"X–3" represents a similar suspension of potassium hydroxide prepared as described under Example III above.

"X–4" represents a similar suspension of potassium hydroxide prepared as described under Example IV above.

"A" represents a sample of potassium hydroxide suspension prepared exactly as described in Example I above, with the exception that xylene was used instead of diethylene glycol diethyl ether.

"B" represents a suspension of potassium hydroxide prepared exactly as described under Example I above, with the exception that butyl ether was used instead of diethylene glycol diethyl ether.

TABLE

| Potassium Hydroxide Suspension | Conversion of Acetone to 2-Methyl-3-butyne-2-ol | Menstruum Output |
|---|---|---|
| | Per cent | g./l. |
| X–1 | 44 | 76.4 |
| X–2 | 38.6 | 87.5 |
| X–3 | 34.2 | 67.2 |
| X–4 | 95 | 76.1 |
| A | 9.1 | 2.8 |
| B | 56 | 20.2 |

Examination of the data given in the above table shows readily the obvious advantage from the use of potassium hydroxide of the type prepared by our improved procedure. Improved results of a similar character are obtained when using our improved type of potassium hydroxide in other chemical processes requiring an activated form of potassium hydroxide either as a reactant or as a catalyst. Examples of such uses include the preparation of chloretone, etc.

It will be noted that the diethers which have been disclosed as useful in our process are liquid dialkoxy ethers having boiling points within the range of about 100° to 300° C. which do not substantially react irreversibly with potassium hydroxide and in which the alkoxy groups are attached to different carbon atoms.

It will be obvious to those skilled in the art that other diethers of the character described, in addition to those specifically enumerated herein, may be utilized in carrying out our invention, and that the above examples are merely illustrative of our invention and in no way limit the scope thereof. On the contrary, it is intended that the present invention shall cover, by the terminology of the appended claims, all features of patentable novelty which are inherent therein.

This application is a continuation-in-part of our U. S. Serial No. 511,838, filed November 26, 1943, now abandoned.

Having described our invention, what we claim is:

1. A process of producing a highly-active suspension of solid potassium hydroxide which comprises mixing a hydrous potassium hydroxide with a liquid dialkoxy ether having a boiling point within the range of about 100° to 300° C. which does not substantially react irreversibly with the potassium hydroxide and in which the alkoxy groups are attached to different carbon atoms, heating the mixture above the melting point of the hydrous potassium hydroxide and distilling off any water which may be present in excess of about 1 mole of water per mole of potassium hydroxide, then cooling the resulting mixture to solidify the potassium hydroxide while vigorously agitating to produce a finely divided highly-active suspension of potassium hydroxide.

2. The process of claim 1 wherein from about 7 to 35 per cent of a primary monohydric alcohol containing from 4 to 8 carbon atoms is present in the mixture.

3. The process of claim 2 wherein said primary monohydric alcohol is butanol.

4. The process of claim 1 wherein said dialkoxy ether is diethylene glycol diethyl ether.

5. A process of producing a highly-active suspension of solid potassium hydroxide which comprises mixing a hydrous potassium hydroxide with a liquid dialkoxy ether having a boiling point within the range of about 100° to 300° C. which does not substantially react irreversibly with the potassium hydroxide and in which the alkoxy groups are attached to different carbon atoms, distilling the mixture to remove water in the form of the azeotrope with said ether, removing the water from the distillate and returning the latter to the mixture, continuing the distillation until the water in the mixture is reduced to an amount not substantially exceeding 1 mole per mole of potassium hydroxide, the distillation being conducted at a temperature sufficiently high to cause at least partial fusion of the potassium hydroxide, cooling the mixture while vigorously agitating the same to solidify the potassium hydroxide and to produce a finely-divided highly-active suspension of the same.

6. The process of claim 5 wherein the mixture contains from about 7 to 35 per cent of a primary monohydric alcohol containing from 4 to 8 carbon atoms.

GLEN H. MOREY.
EVERET F. SMITH.

REFERENCES CITED

The following references are of record in the file of this patent:

UNITED STATES PATENTS

| Number | Name | Date |
|---|---|---|
| 1,835,271 | Burke et al. | Dec. 8, 1931 |
| 2,019,468 | Bacon | Oct. 29, 1935 |
| 2,288,667 | Allen et al. | July 7, 1942 |
| 2,326,099 | Kokatnur et al. | Aug. 3, 1943 |
| 2,345,170 | Zeltner et al. | Mar. 28, 1944 |
| 2,367,273 | Hall et al. | Jan. 16, 1945 |
| 2,385,548 | Smith | Sept. 25, 1945 |